US008836928B2

(12) United States Patent
Tanaka

(10) Patent No.: US 8,836,928 B2
(45) Date of Patent: Sep. 16, 2014

(54) METHOD FOR MEASURING WAVEFRONT ABERRATION AND WAVEFRONT ABERRATION MEASURING APPARATUS

(75) Inventor: Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 100 days.

(21) Appl. No.: 13/503,028

(22) PCT Filed: Oct. 19, 2010

(86) PCT No.: PCT/JP2010/068347
§ 371 (c)(1),
(2), (4) Date: Apr. 19, 2012

(87) PCT Pub. No.: WO2011/049075
PCT Pub. Date: Apr. 28, 2011

(65) Prior Publication Data
US 2012/0206719 A1    Aug. 16, 2012

(30) Foreign Application Priority Data

Oct. 20, 2009  (JP) ................................. 2009-240950
Oct. 20, 2009  (JP) ................................. 2009-240951

(51) Int. Cl.
*G01J 1/00*    (2006.01)
*G01M 11/02*   (2006.01)
(52) U.S. Cl.
CPC ................... *G01M 11/0257* (2013.01)
USPC ....................................................... 356/122

(58) Field of Classification Search
USPC ........................................ 356/122, 123, 124.5
See application file for complete search history.

(56) References Cited

U.S. PATENT DOCUMENTS

| 2003/0193647 | A1 | 10/2003 | Neal et al. |
| 2004/0070730 | A1 | 4/2004 | Mihashi et al. |
| 2006/0152709 | A1 | 7/2006 | Imaizumi |
| 2011/0205514 | A1* | 8/2011 | Kita ................................. 355/67 |

FOREIGN PATENT DOCUMENTS

| JP | 58-092927 A | 6/1983 |
| JP | 08-086689 A | 4/1996 |

(Continued)

OTHER PUBLICATIONS

English translation of International Preliminary Report on Patentability for International Patent Application No. PCT/JP2010/068347, May 15, 2012.

(Continued)

*Primary Examiner* — Roy M Punnoose
(74) *Attorney, Agent, or Firm* — Miles & Stockbridge P.C.

(57) ABSTRACT

Providing a method for measuring wavefront aberration measured by detecting light that is emanated from a light source, incident on a test lens, and transmitted through the test lens, the method comprising steps of: measuring wavefront aberration in a state where an aperture stop of the test lens is fully opened; measuring a position of the center of a pupil of the test lens in a state where the aperture stop is stopped down; and expanding wavefront aberration by polynomials with making the position of the center of the pupil to be an origin, and a wavefront aberration measuring apparatus.

23 Claims, 14 Drawing Sheets

(56) References Cited

FOREIGN PATENT DOCUMENTS

| | | |
|---|---|---|
| JP | 2002-195913 A | 7/2002 |
| JP | 2002-306416 A | 10/2002 |
| JP | 2004-317376 A | 11/2004 |
| JP | 2005-12190 A | 1/2005 |
| JP | 2005-098933 A | 4/2005 |
| JP | 2006-084787 A | 3/2006 |
| JP | 2006-189386 A | 7/2006 |
| JP | 2007-250723 A | 9/2007 |
| JP | 2007-260336 A | 10/2007 |
| JP | 2008-196916 A | 8/2008 |
| WO | WO 01/58339 A2 | 8/2001 |

OTHER PUBLICATIONS

Chen Ke et al., "Study and Experiment on Extended-Beacon Wavefront Detection for Adaptive Optics", Optical Technique, vol. 27 No. 5, pp. 387-390, Sep. 2001.

Quan Wei et al., "Study on Wavefront Aberration Characteristics of Human Eye as in Large Visual Field", ACTA Photonica Sinica, vol. 36 No. 6, pp. 1102-1105, Jun. 2007.

Office Action (Notification of First Office Action) dated Feb. 17, 2014, in Chinese Patent Application No. 201080052301.9.

\* cited by examiner

FIG. 3A
FIG. 3B
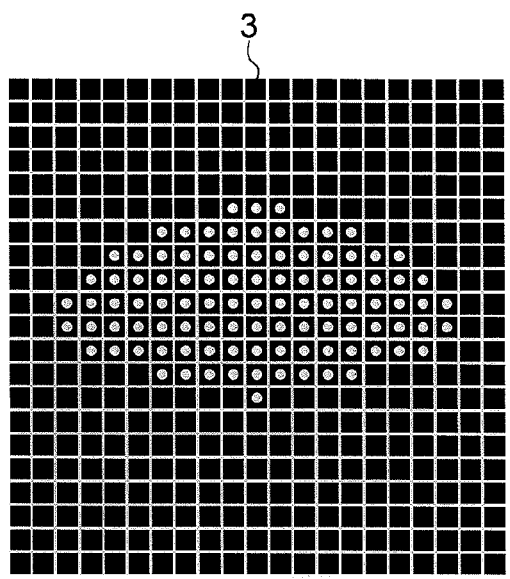
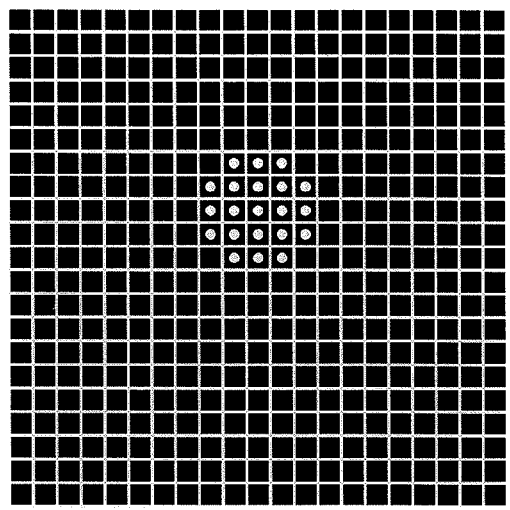

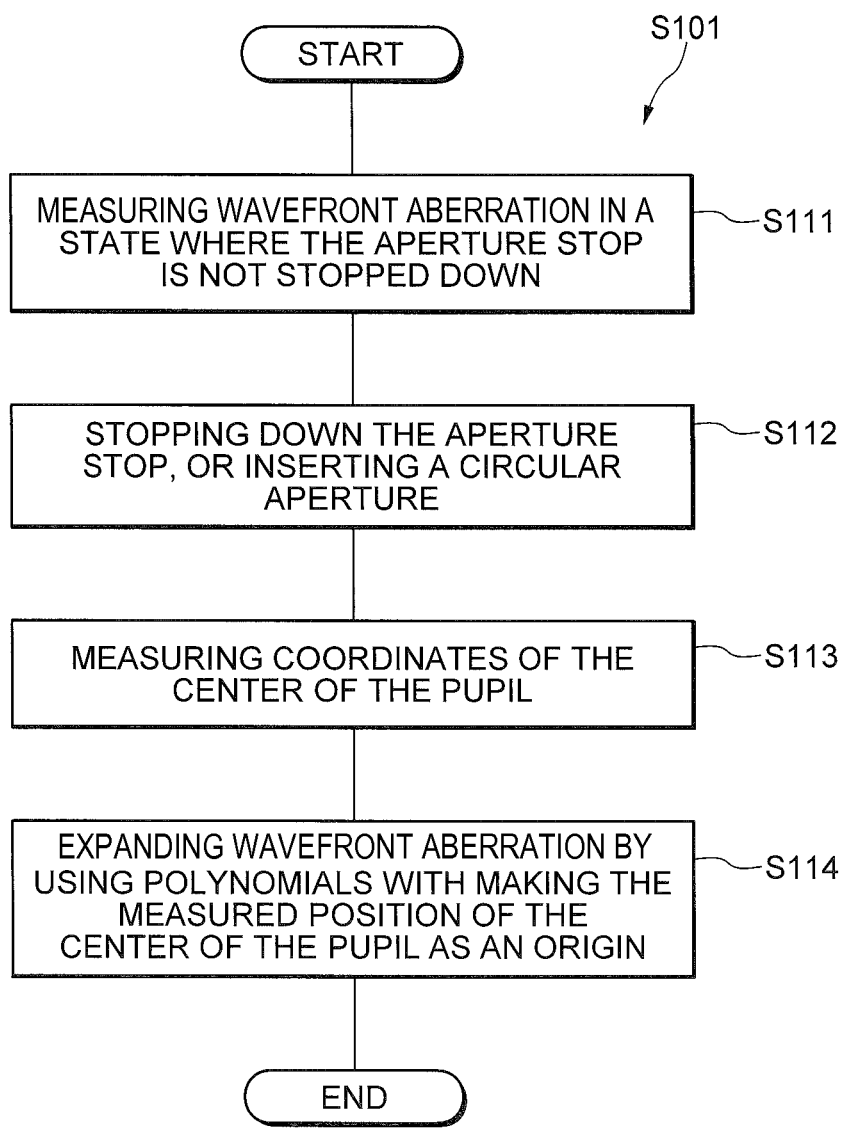

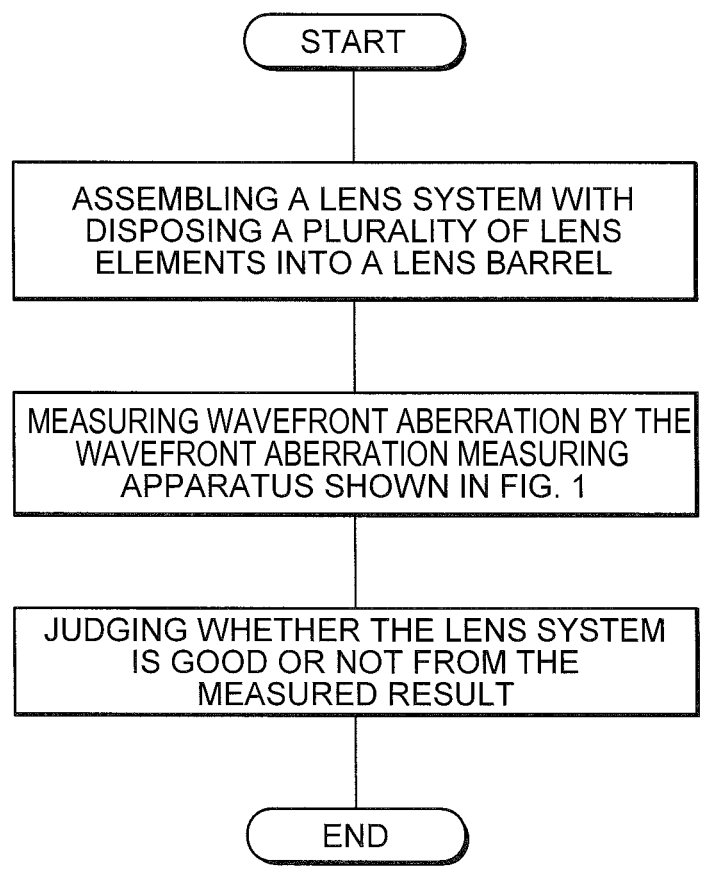

METHOD FOR MEASURING WAVEFRONT ABERRATION AND WAVEFRONT ABERRATION MEASURING APPARATUS

TECHNICAL FIELD

The present invention relates to a method for measuring wavefront aberration and a wavefront aberration measuring apparatus.

BACKGROUND ART

Generally, in an optical design for an imaging optical system (hereinafter simply called an optical system) such as an imaging lens for a camera, optimization is carried out in such a manner that aberrations become optimum in a visible light range of the wavelength from about 400 nm to 700 nm. For example, with using line spectra such as d-line (wavelength: 587.6 nm), C-line (wavelength: 656.3 nm), and g-line (wavelength: 435.8 nm) radiated from helium lamp, hydrogen lamp and mercury lamp, respectively, balance of aberrations at respective wavelengths is optimized so as to obtain maximum optical performance upon imaging by using white light. Moreover, upon manufacturing such an optical system, quality control has been carried out by measuring optical performance by means of deriving modulation transfer function (MTF) mainly from line spread function (LSF) (for example, see Japanese Patent Application Laid-Open No. 58-092927)

More recently, in order to further increase optical performance, quality control has been carrying out by measuring wavefront aberration. As for a method for measuring wavefront aberration, other than an interferometer method that light transmitted through a test lens makes interference with light reflected from a reference surface having a given shape, obtained interference pattern is detected by a two-dimensional imaging device such as a CCD, an output signal from the two-dimensional imaging device is calculated, and wavefront aberration on a pupil of the optical system is derived, a Shack-Hartmann method attracts attention. The Shack-Hartmann method is a method that wavefront transmitted through a test lens is incident on a microlens array, in which a large number of minute microlenses (rectangular lenses) are disposed two-dimensionally, and divided by the microlens array into a large number of spot images formed on a two-dimensional imaging device such as a CCD, and local inclinations of wavefront are calculated from lateral shifts of the spot images detected by the two-dimensional imaging device, and wavefront aberration as a whole is derived (for example, see Japanese Patent Application Laid-Open No. 2005-098933). In a wavefront aberration measurement according to the Shack-Hartmann method, although transversal resolution is limited by the dimension of each micro-lens in comparison with the interferometer method, dynamic range for the measurement is extremely wide, so that the method is particularly suitable for wavefront aberration measurement of an optical system having large amount of remained aberrations such as an imaging lens for a camera.

DISCLOSURE OF THE INVENTION

Problems to be Solved by the Invention

In a general optical system, a shape of an exit pupil with respect to an off-axis ray having a certain angle toward an optical axis is deformed and does not become circular because of a so-called vignetting, so that when measured value of wavefront aberration is expanded by orthogonal polynomials of polar coordinates such as Zernike circle polynomials, there has been a problem that positional accuracy of an origin is low, so that reliability of wavefront measurement becomes low. Even in a projection optical system used in a photolithography process for manufacturing semiconductor device, there is a one whose pupil is not circular because of a small amount of vignetting. When vignetting is a minute quantity of about a few percent, a circle simply inscribed in the pupil is derived and carried out functional expansion, as shown, for example, in Japanese Patent Application Laid-Open No. 2007-250723. However, most of general photographic lenses have large amount of vignetting, and it is not uncommon that the minor axis of the pupil becomes a half of the major axis thereof or less. Accordingly, such technique cannot be applied to this case.

Moreover, different from measurement of MTF, as for a light source used for measurement of wavefront aberration, the width of spectrum is preferably narrow as much as possible. When the width of spectrum becomes a certain amount, owing to chromatic aberration of the test lens, accurate measurement cannot be carried out. Moreover, in measurement of an optical system used in visible light such as a photographic lens, behavior of aberration drastically differs in each wavelength, so that it is necessary to measure at a large number of wavelengths from a short wavelength to a long wavelength in the visible light range. Accordingly, the test apparatus has a construction capable of measuring at a large number of wavelengths with using band-narrowing devices such as interference filters, or with providing many different expensive laser light sources. As a result, the test apparatus becomes larger and more expensive.

The present invention is made in view of the above-described problems, and has an object to provide a method for measuring wavefront aberration capable of increasing wavefront-measuring accuracy, and a wavefront aberration measuring apparatus.

Way to Solve the Problems

According to a first aspect of the present invention, there is provided a method for measuring wavefront aberration measured by detecting light that is emanated from a light source, incident on a test lens, and transmitted through the test lens, the method comprising steps of: measuring wavefront aberration in a state where an aperture stop of the test lens is fully opened; measuring a position of the center of a pupil of the test lens in a state where the aperture stop is stopped down; and expanding wavefront aberration by polynomials with making the position of the center of the pupil as an origin.

In the method for measuring wavefront aberration, it is preferable that the step for measuring the position of the center of the pupil of the test lens in the state where the aperture stop is stopped down is carried out after the step for measuring wavefront aberration in the state where the aperture stop of the test lens is fully opened. Otherwise, the step for measuring wavefront aberration in the state where the aperture stop of the test lens is fully opened may be carried out after the step for measuring the position of the center of the pupil of the test lens in the state where the aperture stop is stopped down.

In the method for measuring wavefront aberration, it is preferable that the polynomials are Zernike circle polynomials.

In the method for measuring wavefront aberration, it is preferable that light emanated from the light source is monochromatic light or quasi-monochromatic light whose full width at half maximum is 10 nm or less.

In the method for measuring wavefront aberration, it is preferable that light emanated from the light source is visible light whose wavelength is from 400 nm to 700 nm.

According to a second aspect of the present invention, there is provided a wavefront aberration measuring apparatus comprising: a two-dimensional imaging device that detects an image of a pupil of a test lens formed by light emanated from a light source transmitted through the test lens; and an information processor that calculates wavefront aberration of the test lens from the image of the pupil detected by the two-dimensional imaging device by using the above-described method for measuring wavefront aberration.

In the wavefront aberration measuring apparatus, it is preferable that the apparatus further comprising: a microlens array that a plurality of microlenses are disposed two-dimensionally, and form spot images of the pupil on the two-dimensional imaging device with dividing and transmitting light transmitted through the test lens, and wherein the information processor calculates wavefront aberration by a Shack-Hartmann method that local inclinations of wavefront are calculated from lateral shifts of the spot images detected by the two-dimensional imaging device, and wavefront aberration as a whole is derived.

In the wavefront aberration measuring apparatus, it is preferable that the information processor controls opening and closing the aperture stop of the test lens.

With constructing a method for measuring wavefront aberration and a wavefront aberration measuring apparatus according to the present invention in this manner, it becomes possible to increase accuracy of wavefront aberration measurement.

According to a third aspect of the present invention, there is provide a method for measuring wavefront aberration measured by detecting light that is emanated from a light source, incident on a test lens, and transmitted through the test lens, the method comprising steps of: measuring wavefront aberration in each wavelength of a plurality of discrete wavelengths with discretely varying wavelength of light emanated from a light source; calculating wavefront aberration coefficients in each wavelength by fitting measured wavefront aberration in each of the plurality of discrete wavelengths to polynomials; calculating fitting coefficients by fitting wavefront aberration coefficients to polynomials in each of the plurality of discrete wavelengths in each of kinds of wavefront aberration coefficients; and calculating wavefront aberration coefficients at a wavelength that is not used for measurements with using the fitting coefficients.

In the method for measuring wavefront aberration according to the third aspect, it is preferable that in step for calculating fitting coefficients, the polynomials used for fitting wavefront aberration coefficients in each of the plurality of discrete wavelengths include at least one term that includes a wavelength in denominator of the term.

In the method for measuring wavefront aberration according to the third aspect, it is preferable that in step for calculating wavefront aberration coefficients, the polynomials used for fitting the wavefront aberration coefficients are orthogonal functions including Zernike circle polynomials.

In the method for measuring wavefront aberration according to the third aspect, it is preferable that light emanated from the light source is monochromatic light or quasi-monochromatic light whose full width at half maximum is 10 nm or less.

In the method for measuring wavefront aberration according to the third aspect, it is preferable that the plurality of discrete wavelengths are three wavelengths or more.

In the method for measuring wavefront aberration according to the third aspect, it is preferable that among the plurality of discrete wavelengths, the shortest wavelength is visible light having a wavelength of 500 nm or less, the longest wavelength is visible light having a wavelength of 600 nm or more, and, as a whole, the plurality of discrete wavelengths are visible light of wavelengths from 400 nm to 700 nm.

According to a fourth aspect of the present invention, there is provided a wavefront aberration measuring apparatus comprising: a two-dimensional imaging device that detects an image of a pupil of a test lens formed by light emanated from a light source transmitted through the test lens; and an information processor that calculates wavefront aberration of the test lens from the image of the pupil detected by the two-dimensional imaging device by using the method for measuring wavefront aberration according to any of the third aspect.

In the wavefront aberration measuring apparatus according to the fourth aspect, it is preferable that the apparatus further comprising: a microlens array that a plurality of microlenses are disposed two-dimensionally, and form spot images of the pupil on the two-dimensional imaging device with dividing and transmitting light transmitted through the test lens, and wherein the information processor calculates wavefront aberration by a Shack-Hartmann method that local inclinations of wavefront are calculated from lateral shifts of the spot images detected by the two-dimensional imaging device, and wavefront aberration as a whole is derived.

With constructing the method for measuring wavefront aberration according to the third aspect and the wavefront aberration measuring apparatus according to the fourth aspect in this manner, it becomes possible to increase accuracy of measuring wavefront aberration despite of an optical system used in wider wavelength range.

According to a fifth aspect of the present invention, there is provided a method for judging a lens system whether it is good or not, the method comprising steps of: assembling the lens system with disposing a plurality of lens elements; measuring wavefront aberration of the assembled lens system by using the wavefront aberration measuring apparatus according to the second aspect; and judging whether the assembled lens system is good or not by the measurement result.

According to a sixth aspect of the present invention, there is provided a method for judging a lens system whether it is good or not, the method comprising steps of: assembling the lens system with disposing a plurality of lens elements; measuring wavefront aberration of the assembled lens system by using the wavefront aberration measuring apparatus according to the fourth aspect; and judging whether the assembled lens system is good or not by the measurement result.

BRIEF DESCRIPTION OF THE DRAWINGS

FIGS. 3A and 3B are explanatory views showing a group of spot images formed by a microlens array on a two-dimensional imaging device, in which FIG. 3A shows a state where the aperture stop of the test lens is fully opened, and FIG. 3B shows a state where the aperture stop of the test lens is stopped down.

FIG. 4 is a flowchart showing processing movement of the wavefront aberration measuring apparatus.

FIG. 5 is a schematic view showing a method for manufacturing a lens system having a plurality of lens elements by using the wavefront aberration measuring apparatus shown in FIG. 1.

EMBODIMENT FOR CARRYING OUT THE INVENTION

First Embodiment

Figure 1:
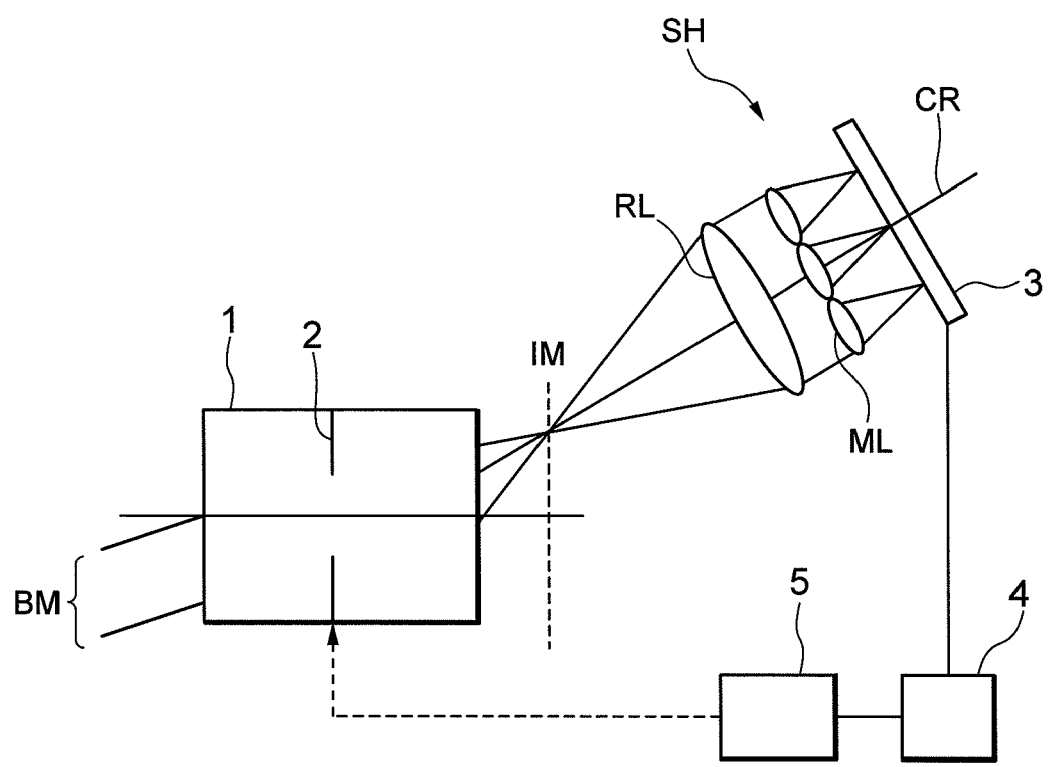
FIG. 1 is an explanatory view showing a construction of a wavefront aberration measuring apparatus according to a first embodiment with fully opened aperture stop of a test lens.

A first embodiment according to the present invention is explained below with reference to accompanying drawings. At first, a construction of a wavefront aberration measuring apparatus according to the present embodiment is explained with reference to FIG. 1. The wavefront aberration measuring apparatus SH is composed of, in order from a test lens 1 side, a relay lens RL, a microlens array ML in which a large number of microlenses such as rectangular lenses are two-dimensionally disposed, a two-dimensional imaging device 3 such as a CCD, a calculator 4 that obtains wavefront aberration data from an electric signal output from the two-dimensional imaging device 3, and an information processor 5 that is constructed by such as a computer storing a program for processing wavefront aberration measurement. Incidentally, a portion or a whole of processing carried out in the calculator 4 may be carried out by the information processor 5.

The other side of the wavefront aberration measuring apparatus SH with the test lens 1 in between, an unillustrated light source is disposed. Moreover, an object side focal point of the relay lens RL substantially coincides with an image plane IM of the test lens 1. Furthermore, an image side focal point of each microlens composing the microlens array ML substantially coincides with a photosensitive surface of the two-dimensional imaging device 3.

When a bundle of rays BM emanated from the unillustrated light source is incident on the test lens 1, the bundle of rays come out from the test lens 1 forms an image on the image plane IM, and is then incident on the relay lens RL. The bundle of rays come out from the relay lens RL that is substantially parallel is incident on the microlens array ML, and forms a group of spot images corresponding to a diameter of incident bundle of rays on the photosensitive surface of the two-dimensional imaging device 3. Here, a pupil of the test lens 1 is conjugate with the plane of incidence of the microlens array ML. Moreover, the bundle of rays BM incident on the test lens 1 may be parallel rays assuming an infinitely distant object, or divergent rays assuming a finite distant object.

When the wavefront aberration measuring apparatus SH is constructed in this manner, each spot image formed on the two-dimensional imaging device 3 generates a lateral shift upon existing aberration in the test lens 1, so that with measuring the lateral shift, local inclination of the wavefront can be calculated by the calculator 4, and with connecting the local inclinations, wavefront aberration of the test lens 1 can be derived.

Incidentally, as for the unillustrated light source, a light source emanating continuous light such as a halogen lamp, or a light source emanating a line spectrum such as a mercury lamp and a helium lamp that is narrowed by a band-narrowing device such as an interference filter may be used. Moreover, a laser light source having a narrow spectrum width may be used. A bundle of rays BM emanated from the light source is preferably monochromatic light or quasi-monochromatic light whose full width at half maximum is 10 nm or less. Wavelengths of light for measuring wavefront aberration are preferably from 400 nm to 700 nm of visible light.

Figure 2:
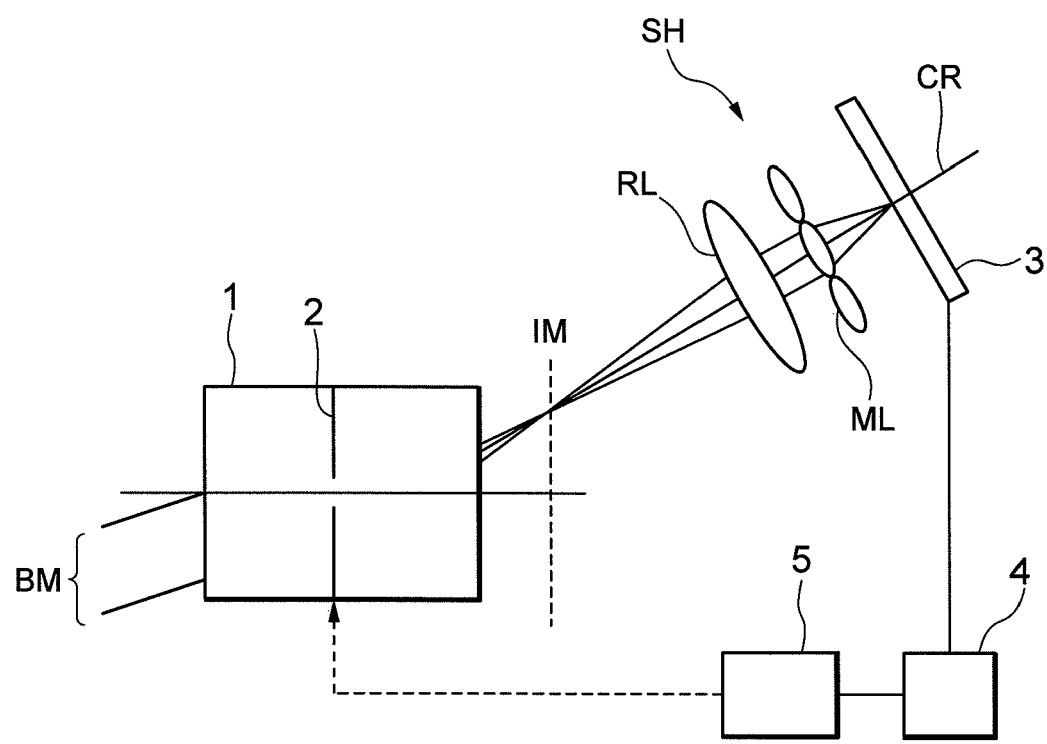
FIG. 2 is an explanatory view showing the wavefront aberration measuring apparatus upon stopping down the aperture stop of the test lens.

An aperture stop 2 is provided in the test lens 1. The aperture stop 2 is for changing an f-number of the test lens 1. The aperture stop 2 may be a variable aperture stop that is constructed by combining a number of blades, or a circular aperture that can be inserted or removed from outside of the test lens 1. FIG. 2 shows a wavefront aberration measuring apparatus SH upon stopping down the aperture stop 2 of the test lens 1. Although the diameter of the bundle of rays BM incident on the test lens 1 is the same, upon limiting the diameter of the bundle of rays by the aperture stop 2, the dimension of the group of spot images formed on the two-dimensional imaging device 3 becomes small. FIGS. 3A and 3B show a group of spot images formed by the microlens array ML on the two-dimensional imaging device 3. The shape of the group of spot images expresses the shape of the pupil of the test lens 1. Here, FIG. 3A shows the group of spot images when the aperture stop 2 of the test lens 1 is not stopped down, and FIG. 3B shows the group of spot images when the aperture stop 2 of the test lens 1 is stopped down. When the bundle of rays BM is come out along the optical axis, in other words, the image height is 0, the shape of the group of spot images on the two-dimensional imaging device 3, in other words, the shape of the pupil becomes substantially circular even if the aperture stop 2 is fully opened. However, when the bundle of rays BM is come out from off-axis position, the shape of the group of spot images does not become substantially circular owing to vignetting as shown in FIG. 3A. On the other hand, when the aperture stop 2 is stopped down until the influence of vignetting does not affect, the shape of the pupil becomes substantially circular as shown in FIG. 3B.

The light ray CR that passes through the center of the aperture stop 2 shows the principal ray. The light ray CR always reaches the imaging device 3 unless the aperture stop 2 is totally closed. Accordingly, the center of the group of spot images formed on the imaging device 3 upon stopping down the aperture stop 2 until the influence of vignetting does not affect is the position of the principal ray, in other words, the center of the pupil.

As shown in FIG. 3A, when the group of spot images formed on the two-dimensional imaging device 3 is not circular shape under the influence of vignetting, it is difficult to determine an accurate position of the center of the pupil of the group of spot images. Accordingly, when wavefront aberration is derived from such group of spot images and expanded by a polar coordinates function such as Zernike circle polynomials, since reliability of the position of the center of the pupil is low, errors are generated upon expanding wavefront aberration. On the other hand, since there is no influence of vignetting in the state shown in FIG. 3B, the shape of the group of spot images becomes substantially circular, so that it is easy to derive the center of the pupil by the calculator 4.

FIG. 4 shows a movement flowchart S101 of wavefront aberration measurement processing of the wavefront aberration measuring apparatus SH according to the present embodiment. Incidentally, the processing is carried out by the information processor 5 as described above. At first, in step S111, wavefront is measured in a state where the aperture stop 2 of the test lens 1 is not stopped down. The measured wavefront is stored in an unillustrated memory connected to the information processor 5. Then, in step S112, the aperture stop 2 of the test lens 1 is stopped down to make larger the f-number and to make smaller the numerical aperture. The movement to stop down the aperture stop 2 may be carried out by moving the aperture stop 2 of the test lens 1 manually by an operator of the wavefront aberration measuring apparatus SH, or by operating electrically from an external apparatus such as, for example, the information processor 5 as shown in FIG. 1. Alternatively, regarding a test lens having no aperture stop mechanism, a circular aperture may be inserted from outside of the test lens. In step S113, in the state where the aperture stop 2 is stopped down, the center of the pupil which is circular without being affected the influence of vignetting is derived by the calculator 4. Then, in step S114, the wavefront stored in the memory connected to the information processor 5 is expanded by using a function such as Zernike circle polynomials circumscribing the pupil with making the position of the center of the pupil derived in step S113 to be an origin.

As described above, in the wavefront aberration measurement, with adding a step that the center of the pupil is derived from the group of spot images having substantially circular shape by stopping down the aperture stop 2, even in the pupil having non-circular shape because of vignetting, reliability of wavefront aberration measurement and expansion by polynomials can be increased. Incidentally, in the processing shown in FIG. 4, although wavefront is measured at first without stopping down the aperture stop 2 and then the center of the pupil is measured with stopping down the aperture stop 2, the center of the pupil may be derived at first with stopping down the aperture stop 2 and then wavefront aberration may be measured with opening the aperture stop 2.

Here, fundamental matters according to Zernike circle polynomials are explained below. As a coordinate system, polar coordinates ($\rho$, $\theta$) are used. As an orthogonal function system, when a Zernike cylindrical function $Zn(\rho, \theta)$ is used, wavefront aberration $W(\rho, \theta)$ is expressed by the Zernike cylindrical function $Zn(\rho, \theta)$ as the following expression (a):

$$W(\rho,\theta)=A1 \cdot Z1(\rho,\theta)+ \ldots +An \cdot Zn(\rho,\theta) \quad (a)$$

where n denotes an order of the polynomials, $\rho$ denotes a normalized radius where the radius of the pupil is to be 1, $\theta$ denotes an angle of vector around the center of pupil, and An denotes a coefficient of the cylindrical function $Zn(\rho, \theta)$.

As shown in expression (a), with using Zernike cylindrical function $Zn(\rho, \theta)$, wavefront aberration $W(\rho, \theta)$ is expressed by the product of n-th order polynomials with respect to the normalized pupil radius $\rho$ and trigonometric function of $m\theta$ with respect to the angle of vector $\theta$. For your information, the first ten terms An of Zernike circle polynomials are shown as follows:

$$A1=1$$

$$A2=\rho \cos \theta$$

$$A3=\rho \sin \theta$$

$$A4=2\rho^2-1$$

$$A5=\rho^2 \cos 2\theta$$

$$A6=\rho^2 \sin 2\theta$$

$$A7=(3\rho^2-2)\cos \theta$$

$$A8=(3\rho^2-2)\sin \theta$$

$$A9=6\rho^4-6\rho^2+1$$

$$A10=\rho^3 \cos 3\theta.$$

As described above, the wavefront aberration measuring apparatus SH according to the present embodiment makes it possible to precisely derive wavefront aberration coefficients derived by expanding wavefront aberration by polynomials even if the test lens has a shape of the pupil without substantially circular by vignetting. Incidentally, wavefront aberration measured in this manner may be used for surface processing of an optical element or adjusting the test lens 1.

Then, an outline of a method is explained with reference to FIG. 5 such that a lens system having plurality of lens elements is measured by the wavefront aberration measuring apparatus SH according to the first embodiment, and whether the lens system is good or not is judged by the measurement result.

At first, a lens system is assembled by disposing a plurality of lens elements into a lens barrel. Wavefront aberration of the assembled lens system is measured by the above-described wavefront aberration measuring apparatus SH shown in FIG. 1. Whether the assembled lens system is good or not is judged from the measured result.

Second Embodiment

Figure 6:
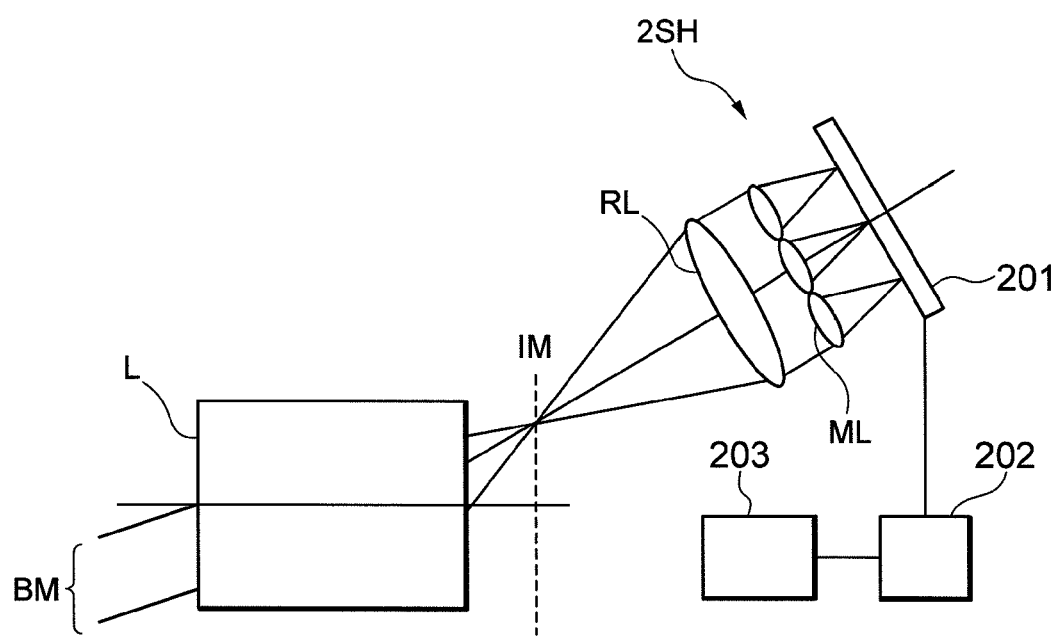
FIG. 6 is an explanatory view showing a construction of a wavefront aberration measuring apparatus according to a second embodiment.

A preferred second embodiment according to the present invention is explained below with reference to accompanying drawings. A construction of a wavefront aberration measuring apparatus according to the second embodiment is explained with reference to FIG. 6. The wavefront aberration measuring apparatus 2SH is composed of, in order from a test lens L side, a relay lens RL, a microlens array ML in which a large number of microlenses such as rectangular lenses are two-dimensionally disposed, a two-dimensional imaging device 201 such as a CCD, a calculator 202 that obtains wavefront aberration data from an electric signal output from the two-dimensional imaging device 201, and an information processor 203 that is constructed by such as a computer storing a program for processing wavefront aberration measurement. Incidentally, a portion or a whole of processing carried out in the calculator 202 may be carried out by the information processor 203.

The other side of the wavefront aberration measuring apparatus 2SH with the test lens L in between, an unillustrated light source is disposed. Moreover, an object side focal point of the relay lens RL substantially coincides with an image plane IM of the test lens L. Furthermore, an image side focal point of each microlens composing the microlens array ML substantially coincides with a photosensitive surface of the two-dimensional imaging device 201.

When a bundle of rays BM emanated from the unillustrated light source is incident on the test lens L, the bundle of rays come out from the test lens L forms an image on the image plane IM, and is then incident on the relay lens RL. The bundle of rays come out from the relay lens RL that is substantially parallel is incident on the microlens array ML, and forms a group of spot images corresponding to a diameter of incident bundle of rays on the photosensitive surface of the two-dimensional imaging device 201. Here, a pupil of the test lens L is conjugate with the plane of incidence of the microlens array ML. Moreover, the bundle of rays BM incident on the test lens L may be parallel rays assuming an infinitely distant object, or divergent rays assuming a finite distant object.

When the wavefront aberration measuring apparatus 2SH is constructed in this manner, each spot image formed on the two-dimensional imaging device 201 generates a lateral shift upon existing aberration in the test lens L, so that with measuring the lateral shift, local inclination of the wavefront can be calculated by the calculator 202, and with connecting the local inclinations, wavefront aberration of the test lens L can be derived.

Incidentally, as for the unillustrated light source, a light source emanating continuous light such as a halogen lamp, or a light source emanating a line spectrum such as a mercury lamp and a helium lamp that is narrowed by a band-narrowing device such as an interference filter may be used. Moreover, a laser light source having a narrow spectrum width may be used. A bundle of rays BM emanated from the light source is preferably monochromatic light or quasi-monochromatic light having a full width at half maximum of 10 nm or less.

Figure 7:
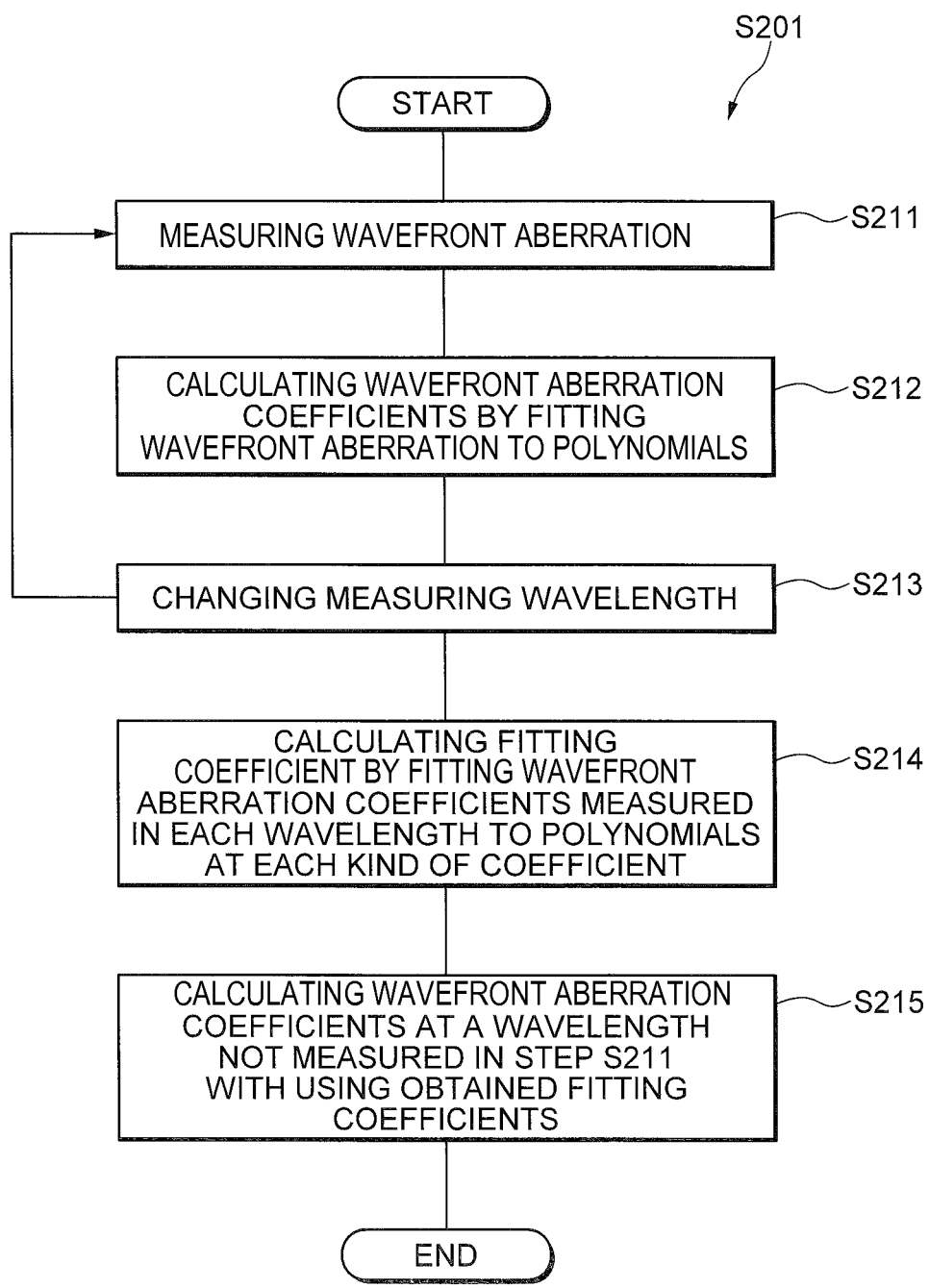
FIG. 7 is a flowchart showing processing movement of the wavefront aberration measuring apparatus according to the second embodiment.

FIG. 7 shows a movement flowchart S201 of wavefront aberration measurement processing of the wavefront aberration measuring apparatus 2SH according to the second embodiment. Incidentally, the processing is carried out by the information processor 203 as described above. At first, in step S211, wavefront aberration of the test lens L is measured. The measured wavefront is stored in an unillustrated memory connected to the information processor 203. Then, in step S212, wavefront aberration obtained in step S211 is fitted, for example, to Zernike circle polynomials, and wavefront aberration coefficients are calculated and stored in the unillustrated memory connected to the information processor 203.

Fundamental matters regarding Zernike circle polynomials have been explained above, so that the explanations are omitted here.

Then, in step S213, measurement wavelength is changed, and with returning to step S211, wavefront aberration is measured. In order to change wavelength, a band-narrowing device such as an interference filter may be changed, or a laser light source having different wavelength may be used. After completing measurements on given kinds of wavelengths, in step S214, wavefront aberration coefficients of each wavelength stored in the memory connected to the information processor 203 are fitted to polynomials at each kind of coefficient, and fitting coefficients are calculated and stored in the unillustrated memory connected to the information processor 3. Finally, in step S215, with using fitting coefficients obtained in step S214, wavefront aberration coefficients at a wavelength that is not used for measurements in step S211 are calculated.

As a specific example, explanations are shown blow with using a lens system shown in Table 1. In (Surface Data) in Table 1, Op denotes an object plane, m denotes a surface number counted from the object side, r denotes a radius of curvature, d denotes a surface distance, nd denotes a refractive index at d-line (wavelength $\lambda$=587.6 nm), vd denotes an Abbe number at d-line, and I denotes an image plane, respectively. Incidentally, a refractive index of the air nd=1.000000 is omitted. In the radius of curvature, r=∞ shows a plane surface.

In (Aspherical Surface Data), an aspherical surface is expressed by the following expression (b):

$$X(y)=(y^2/r)/(1+(1-\kappa \cdot (y^2/r^2))^{1/2})+B4 \times y^4+B6 \times y^6+B8 \times y^8 \qquad (b)$$

where y denotes a vertical height from the optical axis, X(y) denotes an amount of displacement along the optical axis at the height y, r denotes a radius of curvature of a reference sphere (paraxial radius of curvature), $\kappa$ denotes a conical coefficient, and Bn denotes an aspherical surface coefficient at n-th order. Here, E-n shown in aspherical coefficients denotes $\times 10^{-n}$. For example, 1.234E-05 denotes $1.234 \times 10^{-5}$. In (Surface Data), an aspherical surface is expressed by attaching "*" to the right side of the lens surface number.

In (Various Data), f denotes a focal length of the whole of the lens system, FNO denotes an f-number, w denotes a half angle of view (unit: degree), Y denotes an image height, and TL denotes a total lens length that is a distance between an object side surface of the first lens and the image plane I upon focusing on an infinitely distant object.

In respective tables for various values, mm is generally used for the unit of length such as the focal length f, the radius of curvature r and the surface distance d. However, since similar optical performance can be obtained by an optical system proportionally enlarged or reduced its dimension, the unit is not necessarily to be limited to mm, and any other suitable unit can be used.

TABLE 1

(Surface Data)

| m | r | d | nd | vd |
|---|---|---|---|---|
| OP | ∞ | ∞ | | |
| 1 | 41.3555 | 5.0000 | 1.804000 | 46.57 |
| 2 | 158.7150 | 0.1000 | | |
| 3 | 27.3795 | 5.5000 | 1.834807 | 42.71 |
| 4 | 36.9003 | 1.6000 | | |
| 5 | 45.7517 | 1.6000 | 1.698947 | 30.13 |
| 6 | 16.8163 | 9.3000 | | |
| 7 | 0.0000 | 7.7000 | Aperture Stop | |
| 8 | −17.2554 | 1.8000 | 1.755199 | 27.51 |
| 9 | −153.0397 | 6.5000 | 1.754999 | 52.32 |
| 10 | −26.6098 | 0.2000 | | |
| 11 | −50.0504 | 4.0000 | 1.834807 | 42.71 |
| 12 | −39.2206 | 0.1000 | | |
| 13* | 169.3173 | 0.1000 | 1.552810 | 37.63 |
| 14 | 169.3173 | 5.5000 | 1.729157 | 54.68 |
| 15 | −42.3874 | 38.4757 | | |
| I | ∞ | | | |

(Aspherical Surface Data)
Surface Number: 13

$\kappa$ = 1.0000
B4 = −2.0184E−06
B6 = 7.7020E−10
B8 = −9.5209E−13

(Various Data)

f = 51.61
FNO = 1.44
ω = 23.00
Y = 21.60
TL = 87.48

Example 1

In the following Table 2, wavefront aberration coefficients at six wavelengths from h-line (wavelength λ=404.7 nm) to C-line (wavelength λ=656.3 nm) of the image height 0 mm and 15 mm of the lens system shown in Table. 1 are shown. Here, the unit of wavelength is nm. Moreover, an example of wavefront aberration coefficients at the image height 0 mm, the ninth term of Zernike circle polynomials, which shows spherical aberration, and at the image height 15 mm, the fifth term of Zernike circle polynomials, which shows astigmatism, are shown (unit: μm).

TABLE 2

(Wavefront aberration Coefficients)

| wavelength | Y = 0 mm ninth term | Y = 15 mm fifth term |
|---|---|---|
| 656.3 | −1.99114 | −16.3784 |
| 587.6 | −1.73565 | −16.4916 |
| 546.1 | −1.49063 | −15.5845 |
| 486.1 | −1.08321 | −11.3817 |
| 435.8 | −1.21427 | −2.6619 |
| 404.7 | −2.45257 | 8.0136 |

Then, an example that aberration coefficients shown in Table 2 are fitted by polynomials is shown. In order to compare fitting ability of polynomials, the following expressions (1) and (2) are shown:

$$C0 + C1\lambda^2 + C2/\lambda^2 + C3/\lambda^4 + C4/\lambda^6 \quad (1)$$

$$C0 + C1\lambda + C2\lambda^2 + C3\lambda^3 + C4\lambda^4 \quad (2).$$

Expression (1) is composed of a linear combination of a constant term C0, a term directly proportional to the square of λ, and terms inversely proportional to 2N power of λ. Expression (2) is composed of a linear combination of a constant term C0 and terms directly proportional to (2N−1) power of λ. Here, N denotes an integer. Moreover, C0 through C4 are coefficients of each term, and calculated in the above-described step S214.

In Table 3, values of fitting coefficients C0 through C4 upon fitting wavefront aberration coefficients shown in Table 2 by expression (1) and expression (2) are shown.

TABLE 3

(Fitting Coefficients)

| | Y = 0 mm Z9 | | Y = 15 mm Z5 | |
|---|---|---|---|---|
| coef. | exp. (1) | exp. (2) | exp. (1) | exp. (2) |
| C0 | 12.901 | −548.527 | −41.386 | 1783.632 |
| C1 | −10.884 | 4012.572 | 34.670 | −12091.647 |
| C2 | −8.114 | −10935.848 | 5.044 | 30740.212 |
| C3 | 1.992 | 13143.640 | −0.701 | −35009.666 |
| C4 | −0.168 | −5886.292 | 0.171 | 15048.030 |

Figure 8:
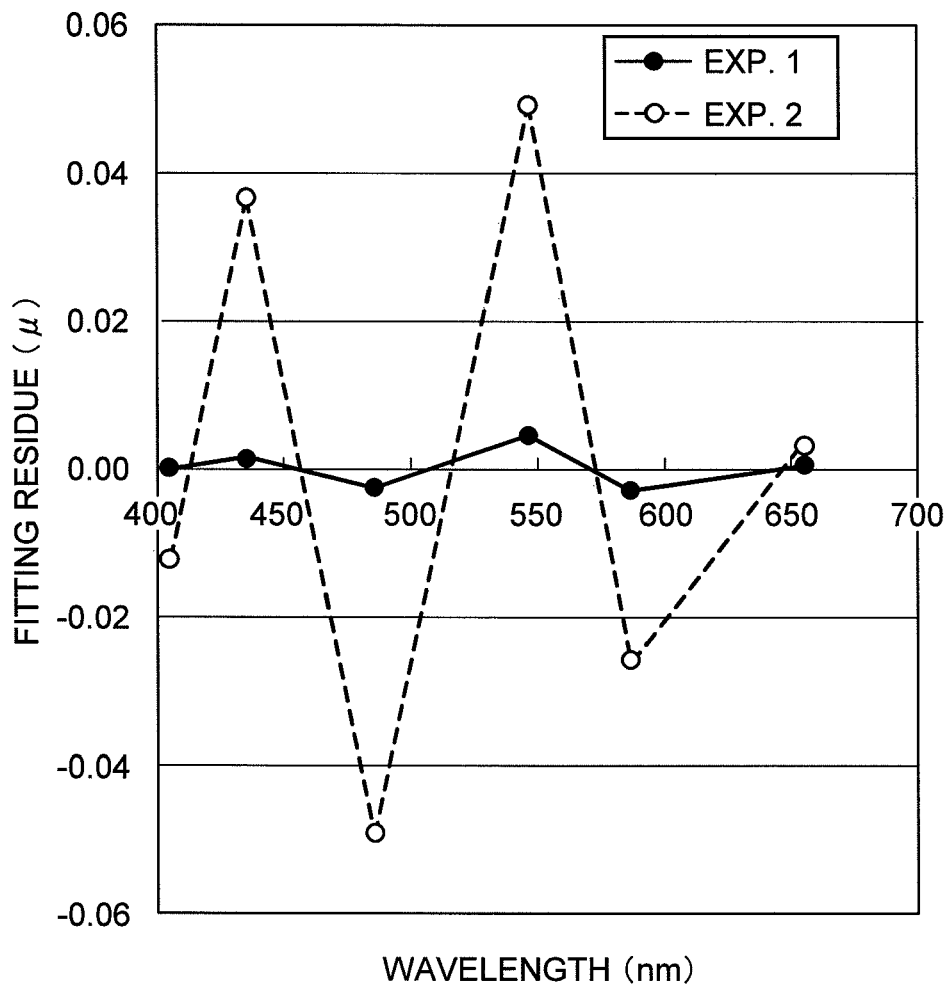
FIG. 8 is a graph showing fitting residue with respect to spherical aberration according to Example 1 of the second embodiment.
Figure 9:
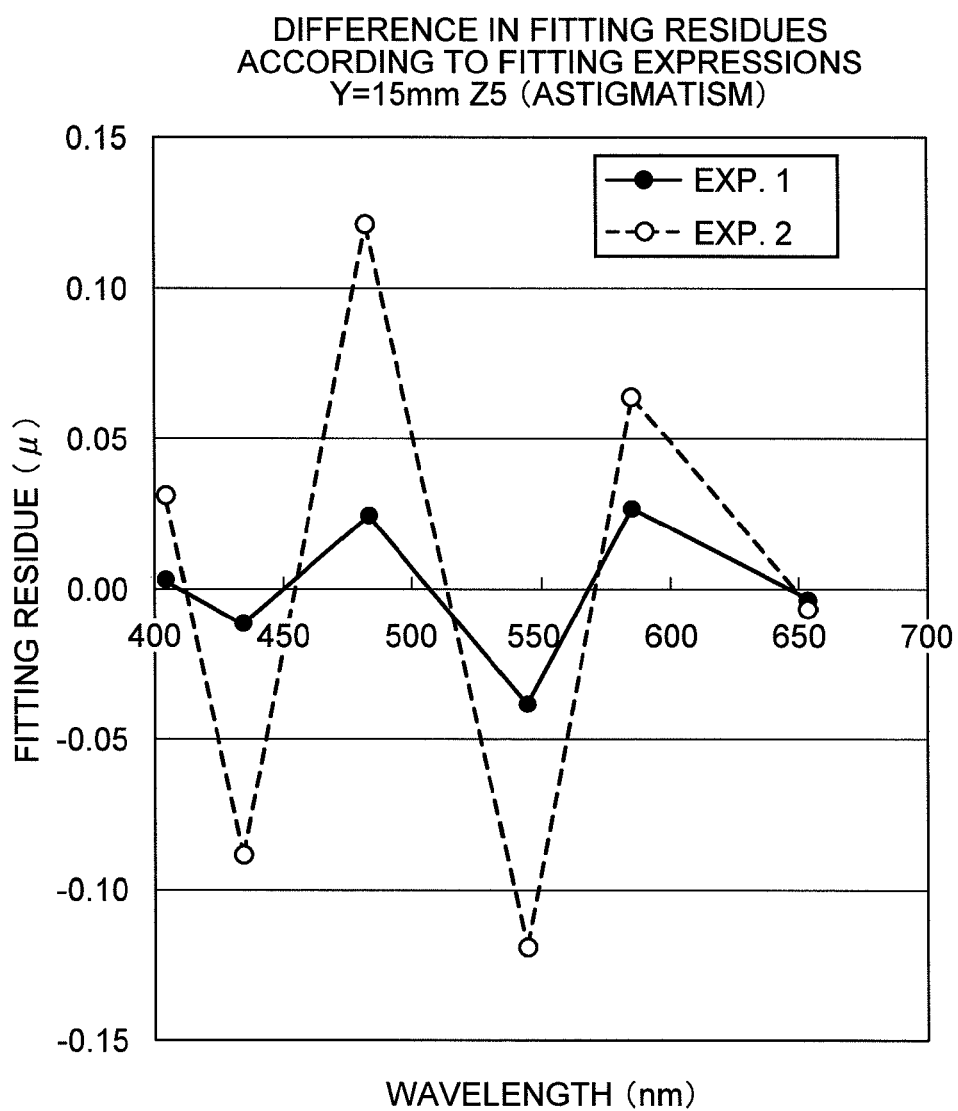
FIG. 9 is a graph showing fitting residue with respect to astigmatism according to Example 1.

FIG. 8 is a graph showing fitting residues upon fitting wavefront aberration coefficient Z9 at the image height 0 mm shown in Table 2 by using expression (1) and expression (2). Moreover, FIG. 9 is a graph showing fitting residues upon fitting wavefront aberration coefficient Z5 at the image height 15 mm shown in Table 2 by using expression (1) and expression (2).

Example 2

Then, Example 2 shows a case where the number of wavelengths at which wavefront aberration coefficients are fitted is reduced from six to four. The four wavelengths are, in order from shorter one, h-line (wavelength λ=404.7 nm), g-line (wavelength λ=435.8 nm), e-line (wavelength λ=546.1 nm) and C-line (wavelength λ=656.3 nm). Used optical system is the one shown in Table 1, and wavefront aberration coefficients that are shown in Table 2 are used.

Figure 10:
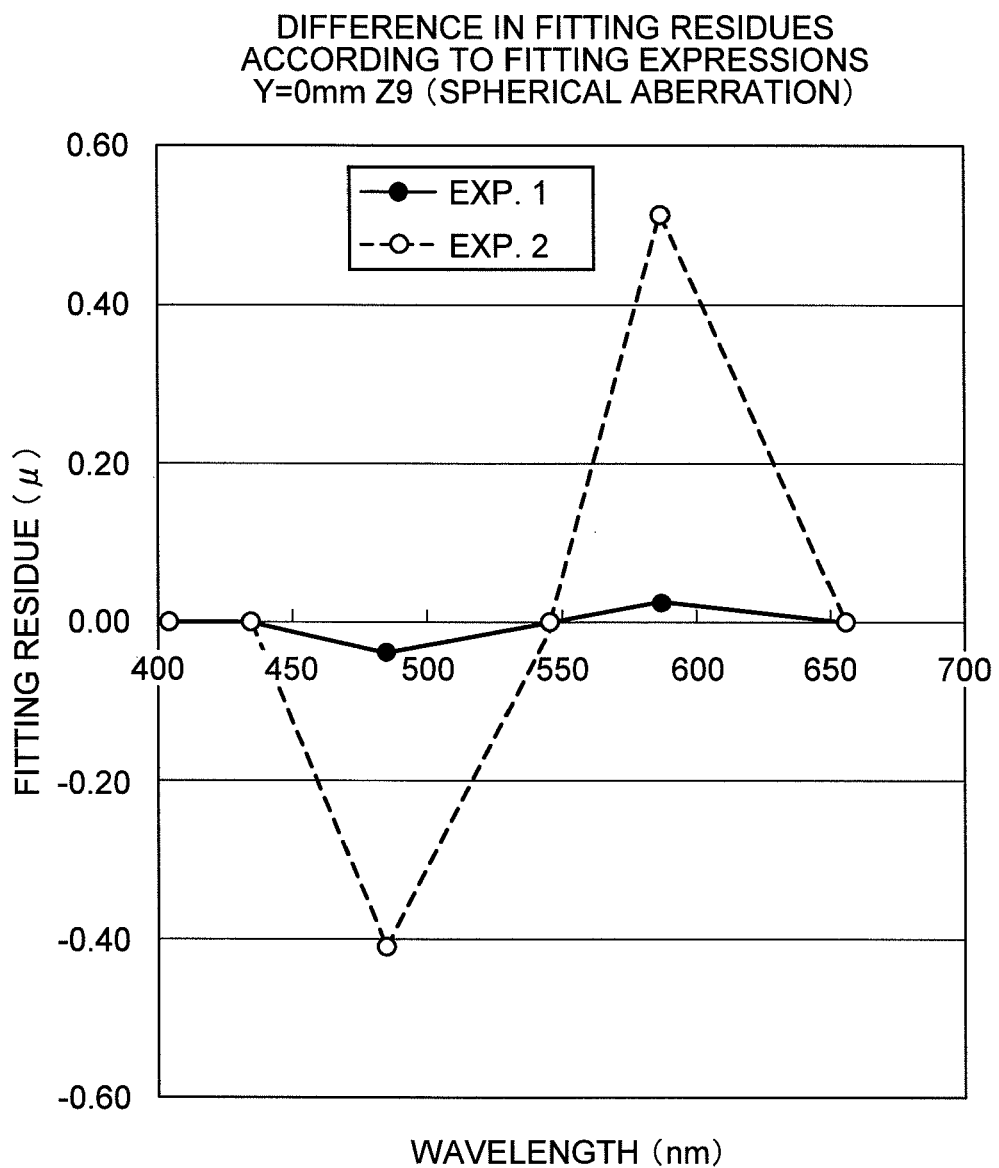
FIG. 10 is a graph showing fitting residue with respect to spherical aberration according to Example 2 of the second embodiment.
Figure 11:
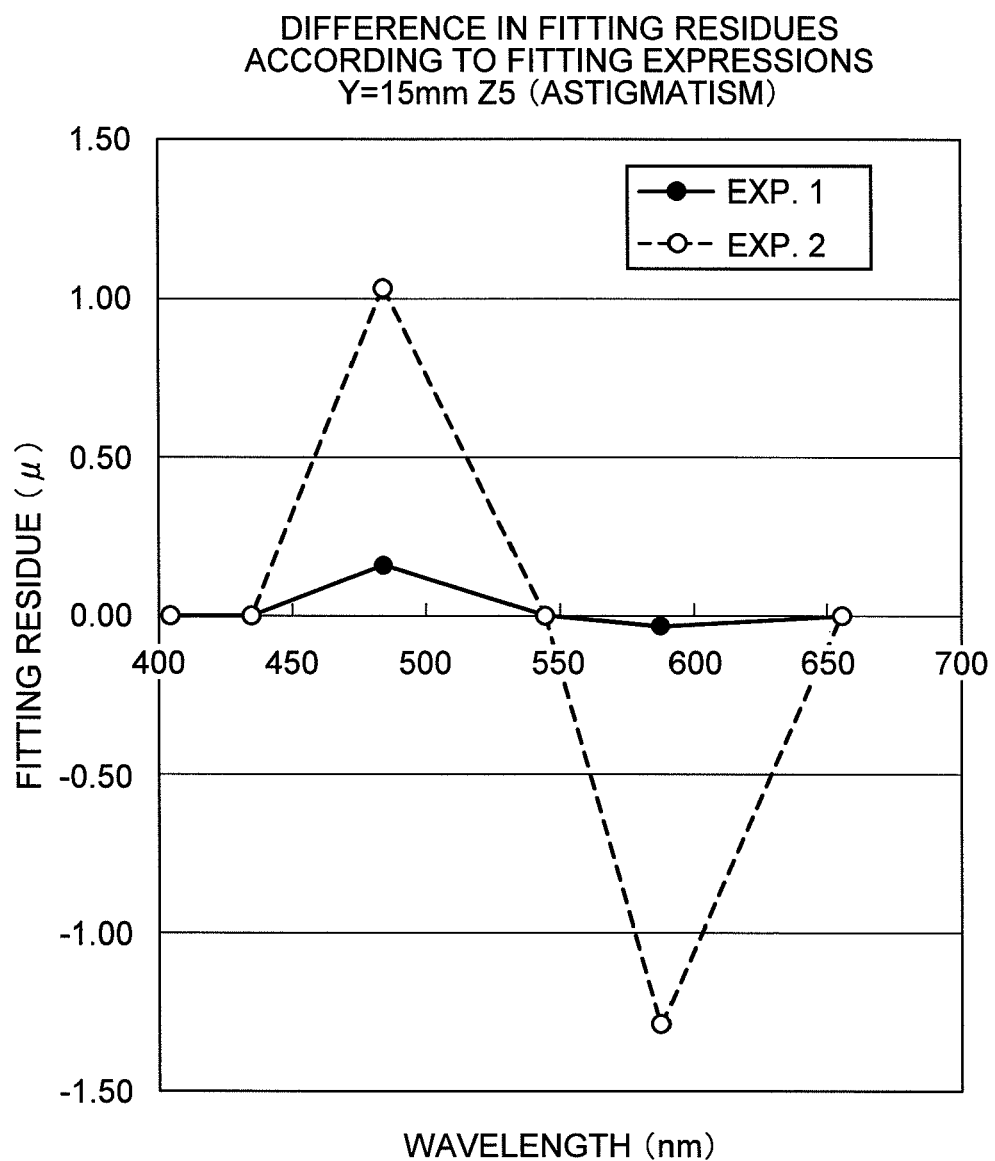
FIG. 11 is a graph showing fitting residue with respect to astigmatism according to Example 2.

FIG. 10 is a graph showing fitting residues upon fitting wavefront aberration coefficient Z9 at the image height 0 mm shown in Table 2 by using expression (1) and expression (2) when the number of wavelengths is four. Moreover, FIG. 11 is a graph showing fitting residues upon fitting wavefront aberration coefficient Z5 at the image height 15 mm shown in Table 2 by using expression (1) and expression (2) when the number of wavelengths is four.

In Table 4, values of fitting coefficients C0 through C4 upon fitting wavefront aberration coefficients shown in Table 2 by expression (1) and expression (2) when the number of wavelengths is four are shown.

TABLE 4

(Fitting Coefficients)

| | Y = 0 mm Z9 | | Y = 15 mm Z5 | |
|---|---|---|---|---|
| coef. | exp. (1) | exp. (2) | exp. (1) | exp. (2) |
| C0 | 1.143 | −104.520 | −3.416 | 660.433 |
| C1 | −0.059 | 392.590 | −0.072 | −2935.174 |
| C2 | −3.566 | −0.127 | −9.728 | 3081.538 |
| C3 | 1.249 | −1352.606 | 1.724 | 1651.723 |
| C4 | −0.125 | 1225.110 | 0.029 | −2935.899 |

Example 3

Then, Example 3 shows a case where the number of wavelengths at which wavefront aberration coefficients are fitted is reduced from six to three. The three wavelengths are, in order from shorter one, g-line (wavelength λ=435.8 nm), e-line (wavelength λ=546.1 nm) and C-line (wavelength λ=656.3 nm). Used optical system is the one shown in Table 1, and wavefront aberration coefficients that are shown in Table 2 are used.

Figure 12:
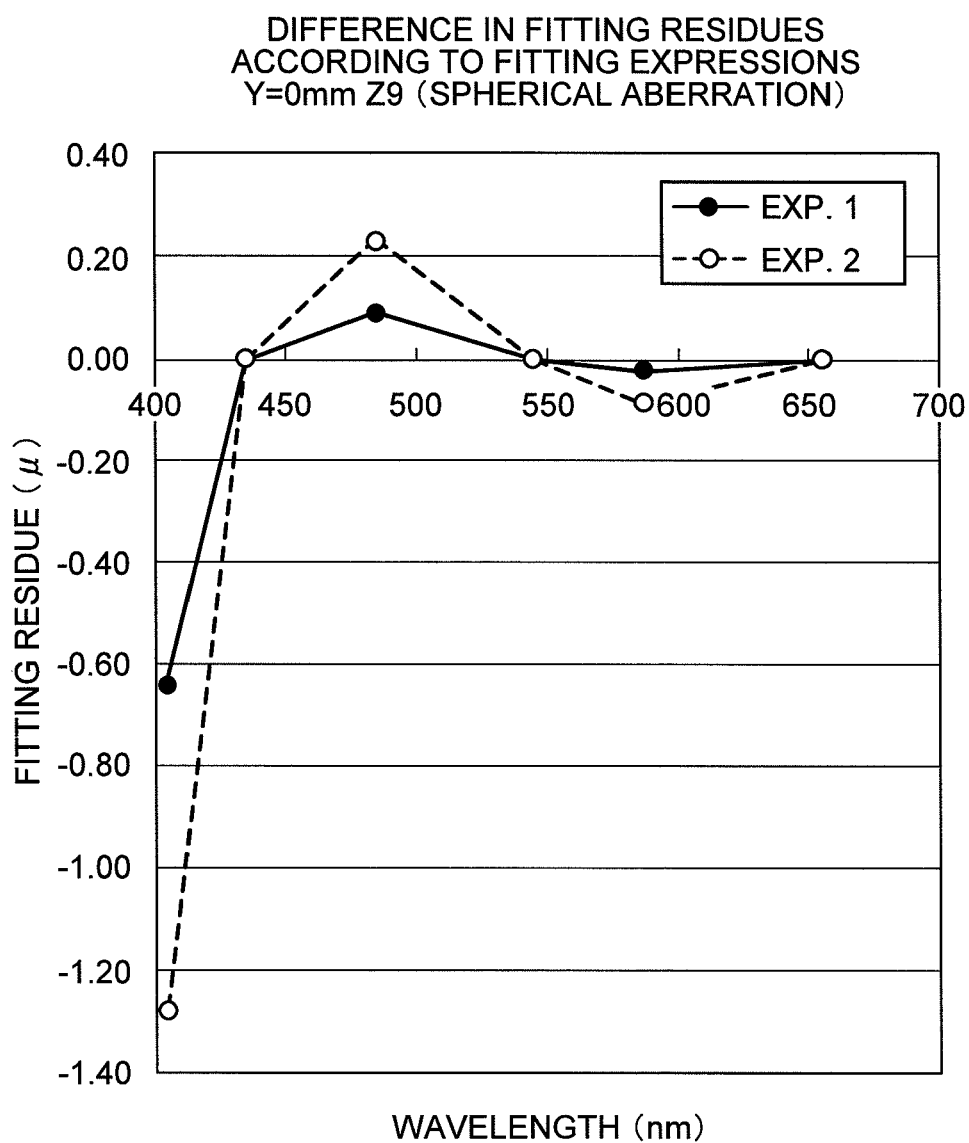
FIG. 12 is a graph showing fitting residue with respect to spherical aberration according to Example 3 of the second embodiment.
Figure 13:
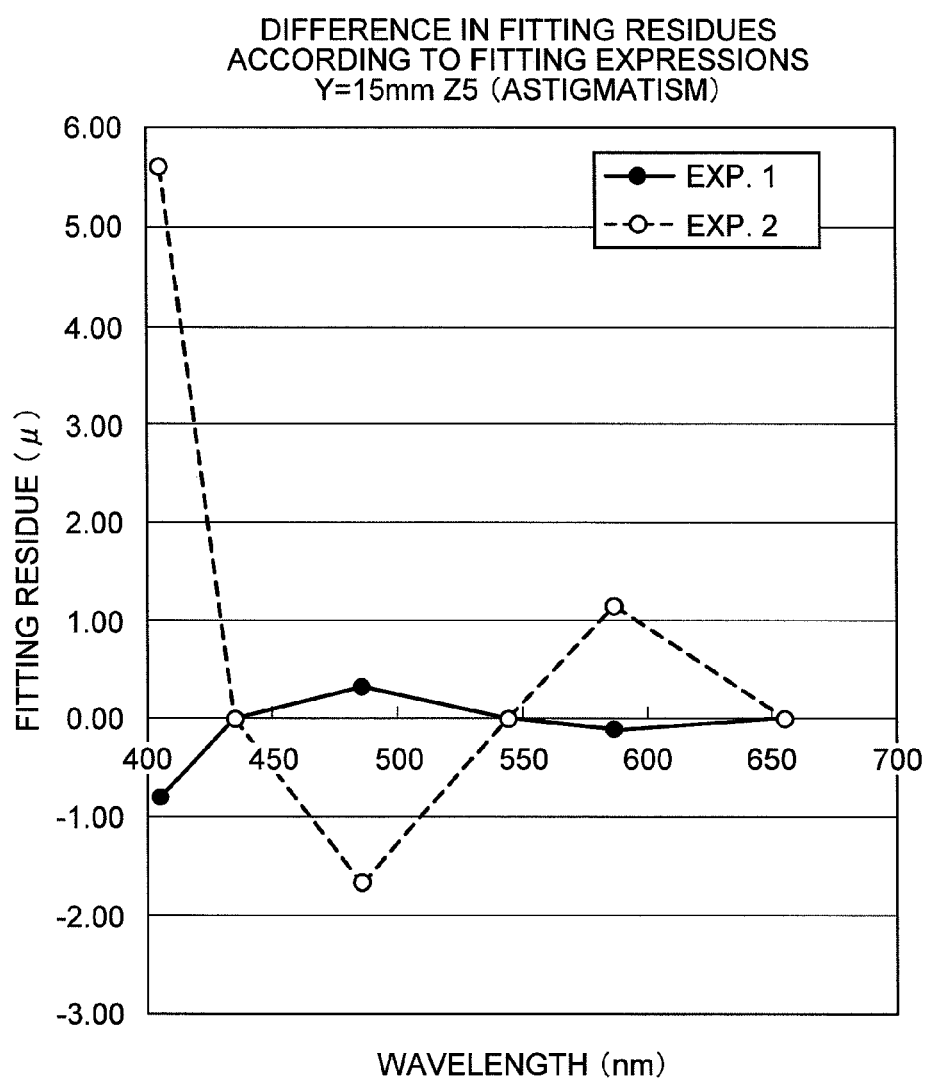
FIG. 13 is a graph showing fitting residue with respect to astigmatism according to Example 3.

FIG. 12 is a graph showing fitting residues upon fitting wavefront aberration coefficient Z9 at the image height 0 mm shown in Table 2 by using expression (1) and expression (2) when the number of wavelengths is three. Moreover, FIG. 13 is a graph showing fitting residues upon fitting wavefront aberration coefficient Z5 at the image height 15 mm shown in Table 2 by using expression (1) and expression (2) when the number of wavelengths is three.

In Table 5, values of fitting coefficients C0 through C4 upon fitting wavefront aberration coefficients shown in Table 2 by expression (1) and expression (2) when the number of wavelengths is three are shown.

TABLE 5

(Fitting Coefficients)

| | Y = 0 mm Z9 | | Y = 15 mm Z5 | |
|---|---|---|---|---|
| coef. | exp. (1) | exp. (2) | exp. (1) | exp. (2) |
| C0 | −1.131 | −1.264 | −5.499 | 84.211 |
| C1 | −0.737 | 1.034 | −1.715 | −195.812 |
| C2 | −1.086 | −0.640 | −6.865 | −46.978 |
| C3 | 0.492 | −2.158 | 0.805 | −71.012 |
| C4 | −0.054 | −2.809 | 0.116 | 367.773 |

As shown in FIGS. 8 through 13 according to Example 1 through 3, respectively, in polynomials used for fitting, it is understood that the one side that includes at least one term including wavelength into denominator thereof, in other words, expression (1) has less fitting residue. Generally, in behavior of aberration in wide wavelength range such as visible light range, variation in aberration per unit wavelength becomes very large in short wavelength range in comparison with long wavelength range, so that asymmetry in wavelength direction is large.

Accordingly, in polynomials used for fitting, with using a term that includes the wavelength in denominator thereof, in other words, that is inversely proportional to the wavelength, fitting residue can be made small.

Although an example of polynomials composed of five terms such as expression (1) and expression (2) is shown as an embodiment of the present invention, the number of terms is not limited to this. Moreover, although denominator of each term is constructed by monomial with respect to the wavelength, it may be polynomials.

As described above, the number of discrete plurality of wavelengths for measuring wavefront aberration of the test lens L is preferably three wavelengths or more. Among these wavelengths, it is preferable that the shortest wavelength is 500 nm or less of visible light, and the longest wavelength is 600 nm or more of visible light. As a whole, the wavelength is preferably visible light from 400 nm to 700 nm.

Figure 14:
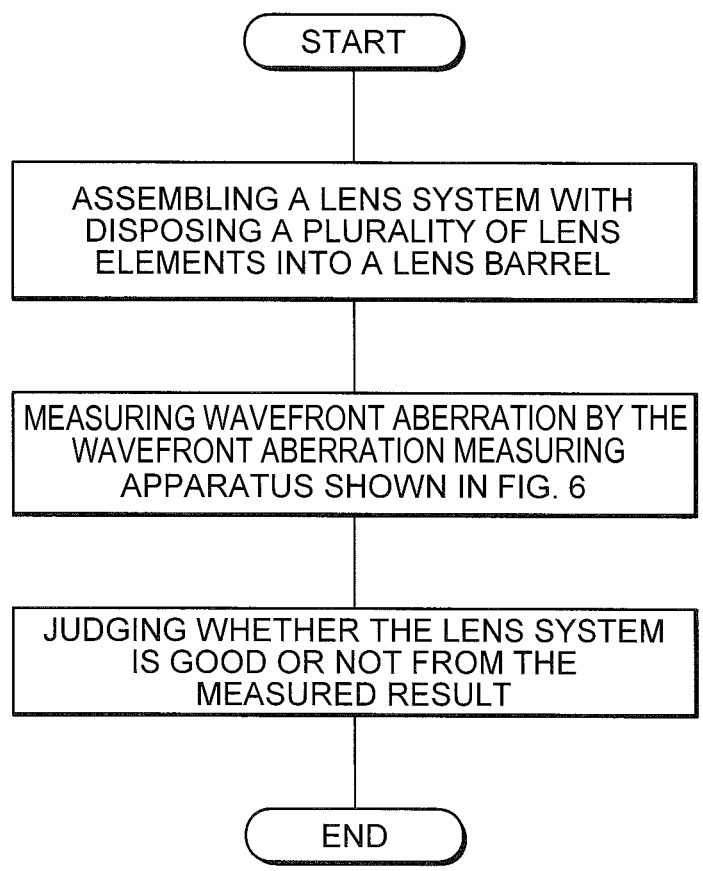
FIG. 14 is a schematic view showing a method for manufacturing a lens system having a plurality of lens elements by using the wavefront aberration measuring apparatus shown in FIG. 6.

Then, an outline of a method is explained with reference to FIG. 14 such that a lens system having plurality of lens elements is measured by the wavefront aberration measuring apparatus 2SH according to the second embodiment, and whether the lens system is good or not is judged by the measured result.

At first, a lens system is assembled by disposing a plurality of lens elements into a lens barrel. Wavefront aberration of the assembled lens system is measured by the above-described wavefront aberration measuring apparatus 2SH shown in FIG. 6. Whether the assembled lens system is good or not is judged from the measured result.

What is claimed is:

1. A method for measuring wavefront aberration measured by detecting light that is emanated from a light source, incident on a test lens, and transmitted through the test lens, the method comprising steps of:
   detecting light that is transmitted through the test lens in a state where an aperture stop of the test lens is fully opened;
   obtaining wavefront aberration data based on the detected light;
   measuring a position of the center of a pupil of the test lens in a state where the aperture stop is stopped down; and
   carrying out a polynomial expansion of wavefront aberration based on the wavefront aberration data with making the position of the center of the pupil to be an origin.

2. The method according to claim 1, wherein the step for measuring the position of the center of the pupil of the test lens in the state where the aperture stop is stopped down is carried out after the step for obtaining wavefront aberration data from the detected light.

3. The method according to claim 1, wherein the step for detecting the light that is transmitted through the test is carried out after the step for measuring the position of the center of the pupil of the test lens in the state where the aperture stop is stopped down.

4. The method according to claim 1, wherein the polynomials of the polynomial expansion are Zernike circle polynomials.

5. The method according to claim 1, wherein light emanated from the light source is monochromatic light or quasi-monochromatic light whose full width at half maximum is 10 nm or less.

6. The method according to claim 1, wherein light emanated from the light source is visible light whose wavelength is from 400 nm to 700 nm.

7. A wavefront aberration measuring apparatus comprising:
   a two-dimensional imaging device that detects an image of a pupil of a test lens formed by light emanated from a light source transmitted through the test lens; and
   an information processor that obtains wavefront aberration data of the test lens from the image of the pupil detected by the two-dimensional imaging device in a state where an aperture stop of the test lens is fully opened, measures a position of the center of a pupil of the test lens in a state where the aperture stop is stopped down, and carries out a polynomial expansion of wavefront aberration based on the wavefront aberration data with making the position of the center of the pupil to be an origin.

8. The wavefront aberration measuring apparatus according to claim 7, further comprising:
   a microlens array in which a plurality of microlenses are disposed two-dimensionally, and form spot images of the pupil on the two-dimensional imaging device with dividing and transmitting light transmitted through the test lens, and
   wherein the information processor obtains the wavefront aberration data by a Shack-Hartmann method in which local inclinations of wavefront are calculated from lateral shifts of the spot images detected by the two-dimensional imaging device, and wavefront aberration as a whole is derived.

9. The wavefront aberration measuring apparatus according to claim 7, wherein the information processor controls opening and closing the aperture stop of the test lens.

10. A method for manufacturing a lens system comprising steps of:
    assembling the lens system with disposing an aperture stop and other lens elements;
    obtaining wavefront aberration data of a test lens from an image of a pupil detected by a two-dimensional imaging device in a state where the aperture stop of the test lens is fully opened;
    measuring a position of the center of a pupil of the test lens in a state where the aperture stop is stopped down;
    carrying out a polynomial expansion of wavefront aberration based on the wavefront aberration data with making the position of the center of the pupil to be an origin; and
    judging whether the assembled lens system is good or not by the result of the polynomial expansion.

11. A method for measuring wavefront aberration measured by detecting light that is emanated from a light source, incident on a test lens, and transmitted through the test lens, the method comprising steps of:
    discretely changing wavelength of light emanated from the light source,
    detecting light of every discrete wavelength;
    obtaining wavefront aberration data for every discrete wavelength based on the detected light;
    calculating wavefront aberration coefficients for every discrete wavelength by carrying out a polynomial fitting of wavefront aberration on the basis of the wavefront aberration data;

calculating fitting coefficients by carrying out a polynomial fitting of the wavefront aberration coefficients for every kind of the wavefront aberration coefficients; and calculating wavefront aberration coefficients at a wavelength for which no wavefront aberration data is obtained with using the fitting coefficients.

12. The method according to claim 11, wherein in the step for calculating fitting coefficients, polynomials used for the polynomial fitting include at least one term that has a wavelength in a denominator of the term.

13. The method according to claim 11, wherein in the step for calculating wavefront aberration coefficients, polynomials used for the polynomial fitting are orthogonal functions including Zernike circle polynomials.

14. The method according to claim 11, wherein light emanated from the light source is monochromatic light or quasi-monochromatic light whose full width at half maximum is 10 nm or less.

15. The method according to claim 11, wherein the discrete wavelengths are three wavelengths or more.

16. The method according to claim 11, wherein among the discrete wavelengths, the shortest wavelength is visible light having a wavelength of 500 nm or less.

17. The method according to claim 11, wherein among the discrete wavelengths, the longest wavelength is visible light having a wavelength of 600 nm or more.

18. The method according to claim 11, wherein the discrete wavelengths are visible light of wavelengths from 400 nm to 700 nm.

19. A wavefront aberration measuring apparatus comprising:

a two-dimensional imaging device that detects an image of a pupil of a test lens formed by light emanated from a light source transmitted through the test lens; and an information processor that, changes discretely wavelength of light emanated from the light source, detects light of every discrete wavelength, obtains wavefront aberration data for every discrete wavelength based on the detected light, calculates wavefront aberration coefficients for every discrete wavelength by carrying out a polynomial fitting of wavefront aberration on the basis of the wavefront aberration data, calculates fitting coefficients by carrying out a polynomial fitting of the wavefront aberration coefficients for every kind of the wavefront aberration coefficients, and calculates wavefront aberration coefficients at a wavelength for which no wavefront aberration data is obtained with using the fitting coefficients.

20. The wavefront aberration measuring apparatus according to claim 19, further comprising:

a microlens array in which a plurality of microlenses are disposed two-dimensionally, and form spot images of the pupil on the two-dimensional imaging device with dividing and transmitting light transmitted through the test lens, and wherein the information processor obtains the wavefront aberration data by a Shack-Hartmann method in which local inclinations of wavefront are calculated from lateral shifts of the spot images detected by the two-dimensional imaging device, and wavefront aberration as a whole is derived.

21. A method for manufacturing a lens system comprising steps of:

assembling the lens system with disposing a an aperture stop and other lens elements; and discretely changing wavelength of light emanated from a light source to the assembled lens system;

detecting light of every discrete wavelength by a two-dimensional imaging device;

obtaining wavefront aberration data for every discrete wavelength based on detected light;

calculating wavefront aberration coefficients for every discrete wavelength by carrying out a polynomial fitting of wavefront aberration on the basis of the wavefront aberration data;

calculating fitting coefficients by carrying out a polynomial fitting of the wavefront aberration coefficients for every kind of the wavefront aberration coefficients;

calculating wavefront aberration coefficients at wavelength for which no wavefront aberration data is obtained with using the fitting coefficients; and judging whether the assembled lens system is good or not by the measurement result of wavefront aberration.

22. The wavefront aberration measuring apparatus according to claim 8, wherein the information processor controls opening and closing the aperture stop of the test lens.

23. The method according to claim 12, wherein in the step for calculating wavefront aberration coefficients, the polynomials used for the polynomial fitting are orthogonal functions including Zernike circle polynomials.

* * * * *